United States Patent [19]

Dala et al.

[11] Patent Number: 4,858,285
[45] Date of Patent: Aug. 22, 1989

[54] TOWEL CLIP

[76] Inventors: Martin L. Dala, 16742 Bayview Dr., Sunset Beach, Calif. 90742; William H. Baxter, 818 Hermosa Dr., San Gabriel, Calif. 91700

[21] Appl. No.: 159,172

[22] Filed: Feb. 23, 1988

[51] Int. Cl.$^4$ .......................... B42F 1/08; A44B 21/00
[52] U.S. Cl. .......................................... 24/555; 24/545
[58] Field of Search ................ 24/555, 545, 563, 562, 24/265 C, 11 R; 160/383, 402, DIG. 15

[56] References Cited

U.S. PATENT DOCUMENTS

| | | |
|---|---|---|
| D. 278,920 | 5/1985 | Wichman . |
| 392,676 | 11/1888 | Jacoby .................................. 24/555 |
| 446,819 | 2/1891 | Ostergren et al. .................... 24/555 |
| 1,152,238 | 5/1871 | Raiford ................................. 24/545 |
| 1,228,266 | 5/1917 | Ustadt .................................. 24/545 |
| 1,962,953 | 6/1934 | Erwin .................................... 24/555 |
| 2,478,530 | 12/1923 | Rooney ................................. 24/555 |
| 2,766,814 | 10/1956 | Sedlacek . |
| 2,861,318 | 11/1958 | Fernberg .............................. 24/562 |
| 2,921,615 | 1/1960 | Kilik ..................................... 24/562 |
| 2,947,052 | 8/1960 | Michalsky ............................ 24/545 |
| 3,661,693 | 5/1972 | Pierson ................................. 24/555 |
| 4,553,785 | 11/1985 | Duke, Jr. et al. . |
| 4,563,796 | 1/1986 | Kettlestrings ....................... 24/555 |
| 4,597,605 | 7/1986 | Gilbert . |

FOREIGN PATENT DOCUMENTS 12000 of 1900 United Kingdom ................ 160/402

*Primary Examiner*—Victor N. Sakran
*Attorney, Agent, or Firm*—Christie, Parker & Hale

[57] ABSTRACT

A towel clip holds a towel in place on a chair back of an outdoor chair such as a beach chair or lounge chair. The clip includes a generally C-shaped semirigid clip member, a pair of side-by-side first clamping members of generally spherical shape on one end of the C, and a second pair of generally spherically shaped clamping members on the other end of the C. The first pair of the clamping members are arranged side by side and the second pair of clamping members are arranged front to rear so that the respective pair of clamping members extend along mutually orthogonal axes. The C-shaped clip is made from a plastic material having a recovery force that holds the spherically-shaped clamping members under slight tension normally so that one pair of clamping members interlocks within a narrow space between the other pair of clamping members and vice versa. The clip ends can be spread apart and slipped over the top of a chair back and around a towel draped over the chair back and held frictionally by the clip so that the towel stays in place on the chair back, yet the clip allows sufficient slippage of the towel between the clamping members to prevent pinching or other towel damage.

9 Claims, 2 Drawing Sheets

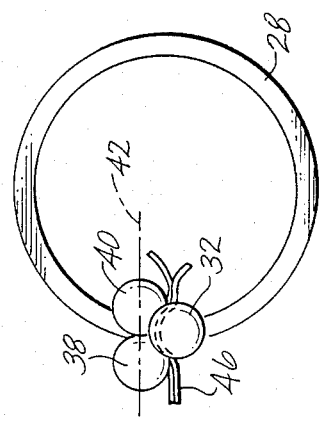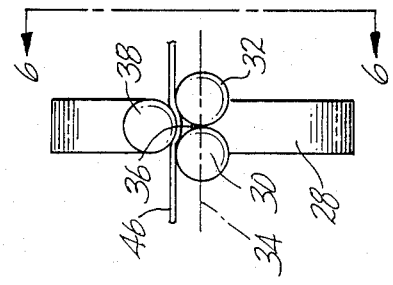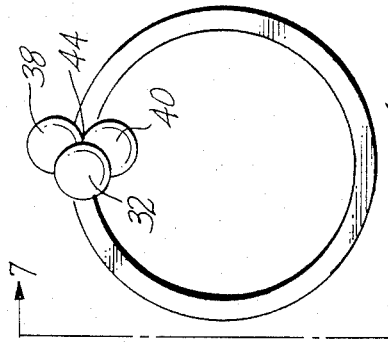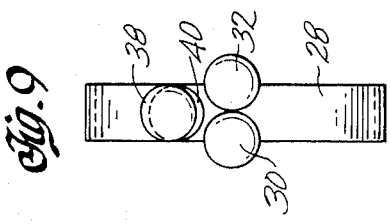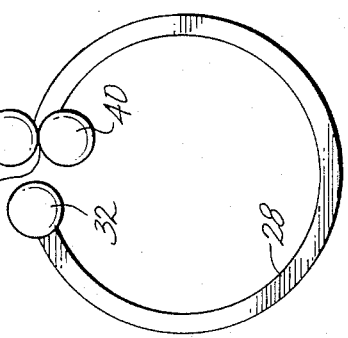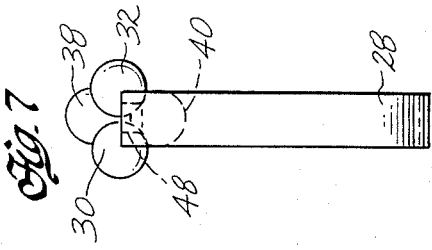

TOWEL CLIP

FIELD OF THE INVENTION

This invention relates to a towel clip for use in holding a beach towel on the back of a beach chair or the like.

BACKGROUND OF THE INVENTION

Lawn chairs, beach chairs and other outdoor chairs are often used by swimmers or sunbathers at the beach or resort areas. For various reasons, it is common for swimmers or sunbathers to place their beach towels over the back of a chair to avoid contact between their body and the material on the back of the chair.

Towels do not normally stay in place on the back of the chair because the person's body movements pull the towel down along the back of the chair and eventually cause the towel to fall off the chair. In other instances, a breeze can cause the towel to move or fall off the back of the chair. It has been observed that people are constantly annoyed by the towel moving and the need to continuously adjust it.

The present invention provides a towel clip that can be attached to the towel and the back of the chair to hold the towel in place. The towel clip is simple to use and inexpensive to manufacture. It also has advantages in use over other towel clips that rely on spring-loaded clips or similar fastening devices that add to the materials and assembly cost of the clip while also causing other disadvantages during use.

SUMMARY OF THE INVENTION

Briefly, the invention provides a towel clip for use in holding a towel in place on a chair back of the type having a relatively wide-diameter top support member and a relatively thin backing extending downwardly away from the top support member to provide a back support for a person resting on the chair. The towel clip includes a narrow generally C-shaped semirigid clip member with a pair of free ends normally positioned close to one another. The C-shaped member has an internal diameter sufficient to fit around the top support member of the chair back and around a towel draped over the chair back. The towel clip further includes a pair of side-by-side first clamping members affixed to one free end of the C-shaped clip member. The first clamping members each have generally spherical curved outer surfaces. One or more second clamping members on the opposite free end of the C-shaped clip member are positioned to normally interlock with the pair of first clamping members. The C-shaped clip member has a recovery force when the ends thereof are spread apart so as to normally move the clamping members toward one another and toward their interlocked position to form a frictional hold on the towel. The material from which the C-shaped clip member is made is sufficiently bendable so that the ends of the clip may be spread apart far enough to pass around the outside diameter of the top support member of the chair back. The recovery force is sufficient so that when the force is released the clip springs back to its normal closed position to provide a frictional hold on the towel draped over the chair back. The frictional hold provided by the towel clip is sufficient to not only hold the towel in place on the chair back, but also allows a moderate amount of slippage between the towel and the clip. Thus, when the user sits down on a towel draped over the chair back, the towel slips just far enough through the clip to compensate for the sudden tug on the towel without the clip otherwise resisting such movement and thereby pinching or stretching the towel.

The towel clip of this invention can be manufactured by simple injection molding techniques, and the resulting towel clip is inexpensive, light in weight, and easy to use. The invention also provides other advantages described in more detail below.

These and other aspects of the invention will be more fully understood by referring to the following detailed description and the accompanying drawings.

BRIEF DESCRIPTION OF THE DRAWINGS

FIG. 4 is a side view of the towel clip in its normal closed position.

FIG. 5 is an end elevation view taken on line 5—5 of FIG. 2 and showing clamping of a towel between the ends of the clip.

FIG. 6 is a side elevation view of the towel clip taken on line 6—6 of FIG. 5.

FIG. 7 is an end view taken on line 7—7 of FIG. 4.

FIG. 8 is a front elevation view similar to FIG. 8 but showing the clip in an open position under tension to more clearly reveal the clamping members of the clip.

FIG. 9 is an end elevation view of the clip similar to FIG. 5 but showing the clip in an open position under tension.

DETAILED DESCRIPTION

Figure 1:
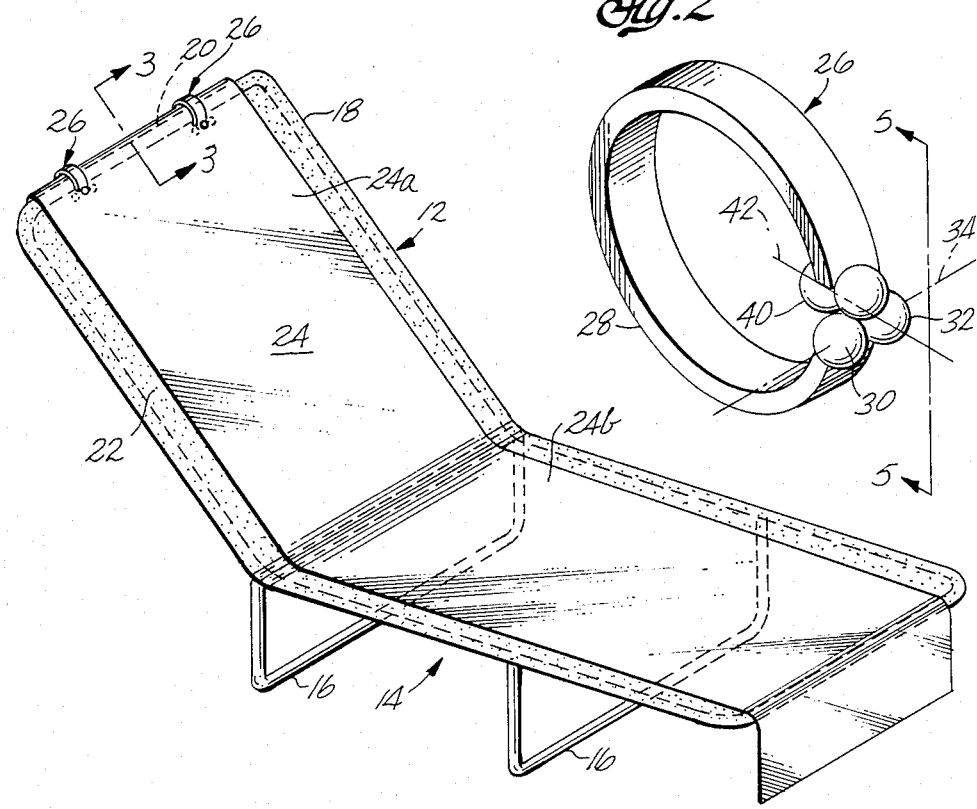
FIG. 1 is a perspective view illustrating a pair of towel clips according to principles of this invention in use for holding a beach towel on the back of a beach chair.
Figure 2:
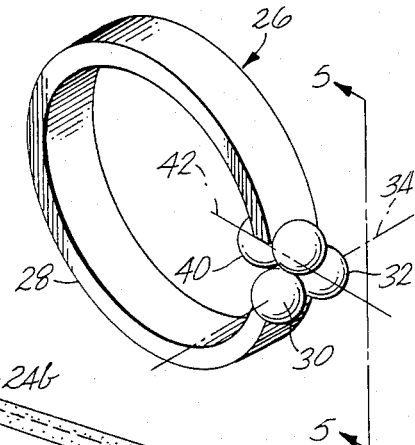
FIG. 2 is a perspective view of the towel clip.

FIG. 1 illustrates a conventional outdoor chair such as a lawn chair, beach chair, lounge chair or other type of chair normally used by swimmers or sunbathers at the beach, next to swimming pools, or at resort areas. The chair generally has an outer frame made of metal tubing for supporting a chair back 12 and a weight supporting chair bottom 14 on which the user sits or rests when using the chair. The chair also includes conventional supports such as upwardly opening U-shaped frame members 16 for elevating the chair above the ground. The back of the chair includes a U-shaped frame typically made from a tubular support member 18 having a top support member 20. The back of the chair also can include a conventional backing 22 such as a nylon panel or cloth, or nylon or vinyl lacing, or the like secured to the top support member of the chair back and extending downwardly between the side frame members of the chair back.

FIG. 1 also shows a beach towel 24 with its upper portion 24a draped over the top of the chair back and its bottom portion 24b extending over the lower horizontal seat portion of the chair. As mentioned previously, it is common for persons to place a beach towel in this manner over an outdoor chair to avoid contact between the person's body and the chair back. However, it is annoying of the towel to be constantly pulled off the chair back when a person sits down in the chair or moves about on the chair.

The present invention provides the towel clip 26 which is used for holding the towel 24 in place on the chair back. As shown best in FIG. 1, a pair of the towel clips 26 can be attached over the top portion of the chair back and around the top portion of the towel which has been draped over the top of the chair back.

The towel clip 26 is constructed entirely from a plastic material. The clip includes a generally C-shaped clip member 28 which is relatively narrow and relatively thin so that the ends of the clip can be spread apart for fitting the clip over the top frame member 20 of the chair. The preferred dimensions of the C-shaped clip member 28 are about 2 inches inside diameter, ⅜ inch wide, and ⅛ inch thick. The C-shaped clip member is preferably made from a semirigid plastic material capable of being spread apart at its ends and returning to its normal position with a stiff return force. A preferred plastic material is Delrin which provides the desired level of resilience and recovery force and is also capable of being manufactured by an injection molding process. (Delrin is the trademark for a type of acetal resin manufactured by Du Pont.)

A first pair of side-by-side clamp members 30 and 32 (referred to as left and right clamp members 30 and 32) are affixed to one free end of the C-shaped clip member 26. The first clamp members are each of substantially spherical shape and are essentially the same size. The two clamp members are also positioned side-by-side so they are aligned on a first axis 34 extending generally perpendicularly to the length of the clip and extending across the width of the clip. When the clip is viewed from the front, as in FIG. 5., the two side-by-side clamp members 30 and 32 provide a generally V-shaped slotted region 36 between them at one end of the clip member 26.

A second pair of front and rear clamp members 38 and 40 are affixed to the other free end of the C-shaped clip member 26. The front and rear clamp members are each aligned on a second axis 42 extending perpendicularly to the front and rear faces of the clip member (on an axis through the thickness of the clip). The axis 42 extends generally at a right angle to the axis through the left and right clamp members 30 and 32. A generally V-shaped slotted region 44 is formed between the front and rear clamp members 38 and 40. The two slotted regions between the pairs of clamping members are aligned with one another and positioned perpendicularly to each other. The two pairs of clamping members are positioned on the ends of the C-shaped clip so that they normally contact one another, with one pair of clamping members nesting within the region between the other pair and vice versa. Nesting of the clamping members is shown in FIGS. 2 and 4 through 7. In this position the two pairs of clamping members are considered to be interlocked in that any piece of flexible material (such as a towel) held between them will normally have a frictional restraining force applied to it by the clamp members.

Figure 3:
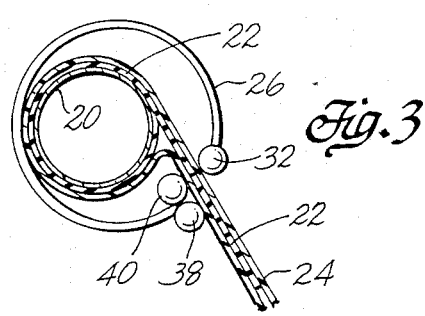
FIG. 3 is a side elevation view showing the towel clip in use.

Use of the towel clip is best understood by referring to FIGS. 1 and 3. When the beach towel 24 is draped over the top support member 20 of the chair back, one or more of the towel clips 26 are then placed around the top of the chair back and held under tension against opposite sides of the towel below the top support member 20. The ends of the towel clip are pried apart so that the clip can be slipped around the top frame member 20 and around both sides of the towel draped over the chair back 22 below the top of the chair. The C-shaped clip member is made from a semirigid plastic material sufficiently flexible to allow the ends of the clip to be spread apart by at least about one inch spacing between the clamping members. FIGS. 8 and 9 illustrate the clip with the ends spread apart by a short distance. When the clip is positioned around the towel and chair back as shown in FIG. 3, the clamping members are held in slight tension against both sides of the towel and the chair back 22. The amount of applied tension is sufficient to frictionally hold the towel in place on the chair back. In some cases, the chair back will not have material in the clamping area, but the function of the clip is the same.

As shown best in FIGS. 5 and 6, a towel 46 (the chair back is not shown in FIGS. 5 and 6) between the clamping members of the clip is contacted at spaced apart points by the clamping members. These contact points are spaced apart on mutually orthogonal axes so that the frictional hold on the towel is spaced apart around an area of contact between the clip and the towel. This provides a good frictional hold on the towel which does not pinch the towel or prevent a slight amount of slippage of the towel between the ends of the clip. As a result, when a person sits down on the chair, the normal body weight applied to the bottom of the towel allows the towel to slip through the ends of the towel clip a short distance just sufficient to prevent pinching the towel, while still holding the towel in place on the chair back.

The preferred process for manufacturing the towel clip is by a plastic injection molding technique in which the front and rear pair of clamping members 38 and 40 are molded integrally with one end of the C-shaped clipped member. The opposite end of the clip member is molded with a post 48 of reduced size. The side-by-side clamp members 30 and 32 are separately molded and these clamping members are then assembled to the free end of the clip by inserting the post in the recess, which allows the two pieces to snap together (interlock).

Thus, the present invention provides a towel clip which can be quickly and easily used to clip a beach towel in place on an outdoor chair, yet allow enough movement of the towel to prevent towel damage. The clip is inexpensive and simple to manufacture.

What is claimed is:

1. A towel clip for use in holding a towel in place on a chair back having a relatively wide-diameter top support member and a relatively tin backing extending downwardly away from the top support member to provide a back support for a person resting on the chair, the towel clip comprising:

a narrow, generally C-shaped semirigid clip member with a pair of free ends normally positioned close to one another, the C having an internal diameter sufficient to fit around the top support member of the chair back and around a towel draped over the chair back;

a pair of side-by-side first clamping members affixed to one free end of the C-shaped clip member and each having a generally spherically curved outer surface; and at least one second clamping member with a generally spherically shaped outer surface affixed to the other free end of the C-shaped clip member and fictionally engaged under tension and positioned to normally interlock within at least a portion of a recessed region between the pair of first clamping members;

the C-shaped clip member having a recovery force when the ends thereof are spread apart so as to normally move the first and second clamping members toward each other and toward said interlocking position to produce a frictional restraint on a portion of the towel between the clamping members, with the cooperating end surfaces of the clamping members allowing such slippage of the towel between the clamping members to prevent pinching of the towel by the clamping members.

2. Apparatus according to claim 1 in which the towel clip includes a pair of said second clamping members affixed to said other free end of the C-shaped clip and aligned along an axis extending orthogonally to the axis of alignment of the first pair of clamping members, wherein the first clamping members interlock in a region between the second clamping members, and vice versa.

3. Apparatus according to claim 2 in which the first pair of clamping members interlock within a narrow region between the second pair of clamping members and vice versa.

4. Apparatus according to claim 1 in which the first pair of clamping members are integrally molded with the C-shaped clip and the second clamping member is assembled to the opposite end of the C.

5. A towel clip for use in holding a towel in place on chair back having a relatively wide-diameter top support member and a relatively thin backing extending downwardly way from the top support member to provide a back support or a person resting on the chair, the towel clip comprising:

a narrow, generally C-shaped semirigid clip member with a pair of free ends normally positioned close to one another, the C having an internal diameter sufficient to fit around the top support member of the chair back and around a towel draped over the chair back;

a pair of side-by-side first clamping members affixed to one free end of the C-shaped clip member and each having a generally spherically curved outer surface;

a pair of second clamping members affixed to said other free end of the C-shaped clip member and each having a generally spherically curved outer surface, and wherein the second clamping members are aligned along an axis extending orthogonally to the axis of alignment of the first pair of clamping members, and wherein the first clamping members interlock in a region between the second clamping members, and vice versa;

the C-shaped clip member having a recovery force when the ends thereof are spread apart so as to normally move the first and second clamping members toward each other and toward said interlocked position to produce a frictional restraint on a portion of the towel between the clamping members.

6. Apparatus according to claim 5 in which the first pair of clamping members interlock within a narrow recessed region between the second pair of clamping members and vice versa.

7. Apparatus according to claim 5 in which the first pair of clamping members are integrally molded with the C-shaped clip, and the second clamping members are assembled on the opposite end of the C.

8. Apparatus according to claim 5 in which the pairs of first and second clamping members normally interlock by frictionally engaging each other under tension.

9. A towel for holding a towel in place on a chair back of an outdoor chair such as a beach chair or lounge chair, the clip including a generally C-shaped semirigid clip member, a pair of side-by-side first clamping members of generally spherical shape on one end of the C, and a second pair of generally spherically shaped clamping members on the other end of the C, the first pair of clamping members being arranged side-by-side, and the second pair of clamping members being arranged front-to-rear so that the respective pairs of clamping members extend along mutually orthogonal axes, the C-shaped clip being made from a material having a recovery force that holds the spherically shaped clamping members under slight tension normally, so that one pair of clamping members interlock frictionally within a narrow space between the other pair of clamping members, and vice versa, so that in use the clip ends can be spread apart and slipped over the top of a chair back and around the towel draped over the chair back and held frictionally by the clip, so that the towel stays in place on the chair back under the restraining force provided by the friction force of the clamping members, yet the clip allows sufficient slippage of the towel between the clamping members to prevent pinching or other towel damage.

* * * * *

UNITED STATES PATENT AND TRADEMARK OFFICE
CERTIFICATE OF CORRECTION

PATENT NO. : 4,858,285
DATED : August 22, 1989
INVENTOR(S) : M.L. Dala; W.H. Baxter It is certified that error appears in the above-identified patent and that said Letters Patent is hereby corrected as shown below:

In the Specification:

Column 2, line 64, change "of" to -- for --.

In the Claims

Column 4, line 46, change "tin" to -- thin --.

Column 5, line 26, before "chair" insert -- a --.

Column 5, line 28, change "way" to -- away --.

Signed and Sealed this

Sixteenth Day of October, 1990

Attest:

HARRY F. MANBECK, JR.

*Attesting Officer*  *Commissioner of Patents and Trademarks*